J.P. MILBURN  TUMBLER WASHER
75443

PATENTED
MAR 10 1868

WITNESSES

United States Patent Office.

JOSEPH P. MILBURN, OF WASHINGTON, DISTRICT OF COLUMBIA.

Letters Patent No. 75,443, dated March 10, 1868.

IMPROVED TUMBLER-WASHER.

The Schedule referred to in these Letters Patent and making part of the same.

TO WHOM IT MAY CONCERN:

Be it known that I, JOSEPH P. MILBURN, of Washington, in the county of Washington, and District of Columbia, have invented certain new and useful Improvements in Tumbler-Washers; and I hereby declare the following to be a full, clear, and exact description of the same, reference being had to the accompanying drawings.

My invention has reference to apparatus employed in connection with soda-fountains, or in restaurants, or other places where it is essential to have the means always at hand for washing tumblers, glasses, or other like articles speedily and thoroughly; and it consists essentially of—

First, the combination of an upright water-tube, upon which the tumbler is supported, of an annular water-tube, or a series of tubes surrounding the tumbler, and a valve-mechanism, substantially as hereinafter described, so that, when the tumbler is placed over or upon its supporting-tube, it will be washed both externally and internally.

Second, the arrangement of the nozzles or orifices through which water is discharged upon the exterior of the tumbler, in the manner hereinafter described, so that the jets of water shall be discharged tangentially or thereabouts to the tumbler.

Third, the combination, with the annular or exterior pipe or pipes, of set-screws or cocks, or equivalent mechanism for regulating the flow and pressure of water in said pipe or pipes.

To enable others skilled in the art to understand and use my invention, I will now proceed to describe the manner in which the same is or may be carried into effect by reference to the accompanying drawings, in which—

Confining attention to that portion of the apparatus upon which the tumbler is placed, and from which water is discharged into the interior of the tumbler, it will be seen that it consists of an upright pipe or tube, A, connected with the main water-pipe B by a joint or box, C, which constitutes a chamber in which the valve for regulating the flow of water is contained. Within the pipe A is a valve-rod or stem, $a$, which extends down through the pipe, and has formed on or attached to its lower end the valve $b$, which is located in the chamber C. The upper part of the valve is conical, while its lower portion is cylindrical, as shown clearly in fig. 2. The size of the valve is such that, when raised and pressed against its seat in the lower end of the pipe A, as indicated in red lines, fig. 2, its lower and cylindrical portion will close the orifice $c$ in the box C, through which the water from the pipe B enters. When, on the contrary, the valve is depressed, as represented in black lines in the same figure, the water, on account of the bevelled or conical formation of the upper part of the valve, is free to enter through the orifice $c$ and pass up through the pipe A. The upper end of the valve-rod $a$, when the valve is closed, rises some distance above the open top of the pipe A, and this end of the rod has formed upon it a series of longitudinal ribs, $d$, which fit in the pipe and serve to steady the valve-rod. The spaces or intervals between the ribs afford ample opportunity for the water to pass out from the pipe when the valve is depressed.

Figure 2:
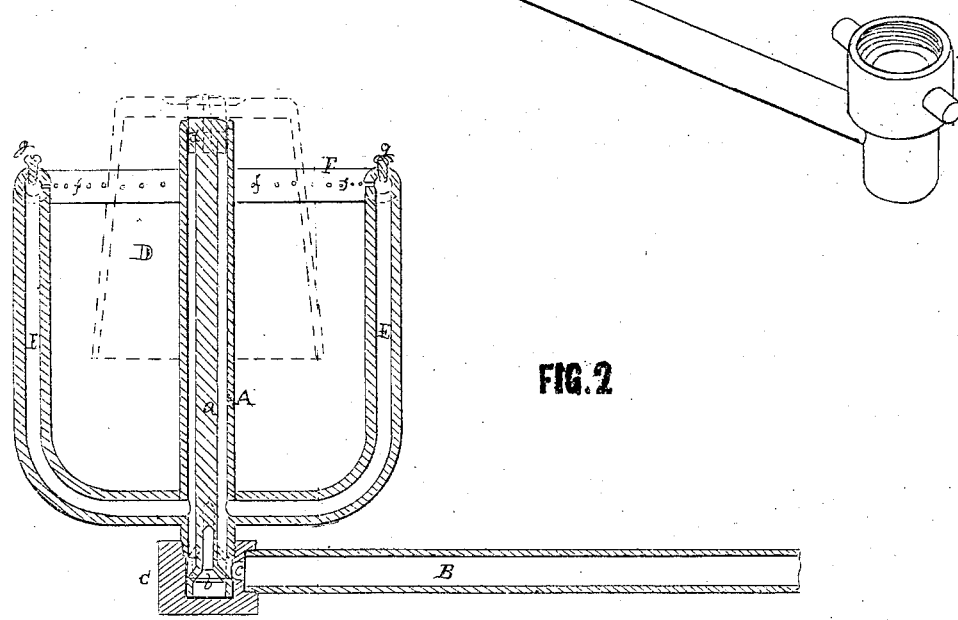
Figure 2 is a vertical central section of the same.

The valve, thus arranged, is held up against its seat, as indicated in red lines, fig. 2, by the pressure of the water in the pipe B. For instance, when the valve is depressed by the weight of the tumbler D placed on its upper end, the water will pass through the orifice $c$ up through the pipe A, from the upper end of which it will be forcibly discharged into the tumbler, the interior of which will be thoroughly washed and cleaned. When, after being cleaned, the tumbler is removed, the impetus of the water, which is driven rapidly and with great force through the pipes over the valve and around the valve-rod, tends to carry up the valve and valve-rod until the former is brought up firmly against its seat, at which time the pressure of the water in the pipe B, as well as in the chamber C, will hold the valve in such position, tightly closing the entrance to the pipe A. Thus the pressure of the valve, when not overbalanced by the superior weight of the tumbler, will hold the valve always to its seat. Under this arrangement, the weight of the valve and valve-rod must, of course, bear a certain proportion to the pressure of the head of water. This, however, can readily be determined, as will be understood without further explanation.

Figure 1:
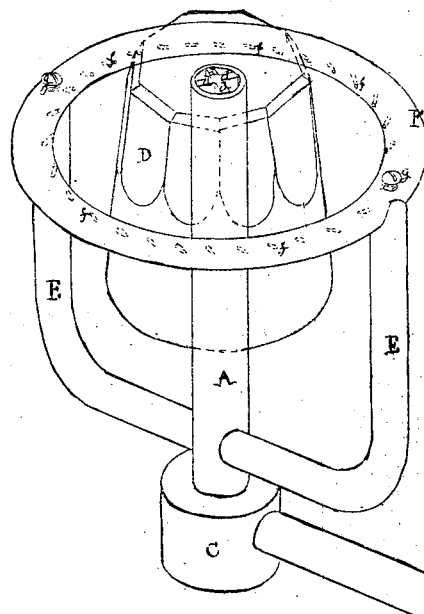
Figure 1 is a perspective view of a tumbler-washing apparatus made in accordance with my invention.

In connection with the apparatus just described for washing the interior of the tumbler, I employ a device for washing the exterior of the same, consisting of one or more upright pipes E, which support and open into an annular pipe, F, provided with a series of orifices or holes, $f$, from which water is discharged directly upon the tumbler placed over the pipe A. The lower ends of the tubes E open into the central pipe A at a point above where the valve $b$ is located, so that, when the valve is opened, water will pass not only through the central pipe A, but also through the conduits E into the annular pipe F, whence it will be discharged in small streams or jets through the orifices $f$ upon the exterior of the tumbler. Thus, by means of the one valve $b$, the flow of water to all the pipes is regulated. At the points where the conduits E open into the annular pipe F, set-screws or cocks $g$ are inserted, by means of which more or less water may be admitted to the annular pipe, as may be desired. Instead of the annular pipe, a series of small upright tubes may be employed, attached to the pipe A, as are the conduits E, and having their upper ends or nozzles turned in toward the tumbler, so that the water discharged therefrom will be projected directly upon the exterior of the tumbler. The orifices $f$ in the annular pipe, or the nozzles of the smaller pipes just referred to, may be inclined or standing with respect to the tumbler, as indicated in fig. 1, so that the water discharged therefrom will strike the tumbler at an acute angle, or tangentially. By this means, if the head of water is at all strong, the tumbler will be caused to revolve rapidly upon the central pipe over which it is placed.

Having now described my invention, and the manner in which the same is or may be carried into effect, what I claim, and desire to secure by Letters Patent, is—

1. The combination, with the central pipe over which the tumbler is placed, of an annular pipe or a series of pipes for discharging water upon the exterior of the tumbler, and a valve-mechanism operated by the weight of the tumbler, so as to admit water to both the central and the exterior pipe or pipes, substantially as and for the purposes herein shown and set forth.

2. The arrangement of the nozzles or orifices through which water is discharged upon the exterior of the tumbler in the manner described, so that the jets of water shall be discharged tangentially or thereabouts to the tumbler, substantially as and for the purposes herein shown and set forth.

3. The combination, with the central pipe, of the annular or exterior pipe and adjusting-screws or equivalent mechanism for regulating the pressure of water in the said pipe, substantially as and for the purposes herein shown and specified.

In testimony whereof, I have signed my name to this specification before two subscribing witnesses.

J. P. MILBURN.

Witnesses:
MARCELLUS BAILEY,
EDM. F. BROWN.